United States Patent
Lennon et al.

(10) Patent No.: US 6,516,090 B1
(45) Date of Patent: Feb. 4, 2003

(54) AUTOMATED VIDEO INTERPRETATION SYSTEM

(75) Inventors: Alison Joan Lennon, Balmain (AU); Delphine Anh Dao Le, Drummoyne (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/296,612

(22) Filed: Apr. 23, 1999

(30) Foreign Application Priority Data

May 7, 1998 (AT) .............................. PP3407

(51) Int. Cl.⁷ .............................. G06K 9/34
(52) U.S. Cl. .................... 382/173; 358/538
(58) Field of Search ................ 382/100, 103, 382/107, 155, 162, 160, 171–172, 173, 181, 232, 305, 228, 229; 345/613, 630, 804, 619, 440; 704/3, 9; 358/403, 538; 348/700, 228; 707/513

(56) References Cited

U.S. PATENT DOCUMENTS

| | | | | |
|---|---|---|---|---|
| 3,988,715 A | * | 10/1976 | Mullan et al. | 382/228 |
| 5,467,441 A | * | 11/1995 | Stone et al. | 345/619 |
| 5,708,767 A | | 1/1998 | Yeo et al. | 395/140 |
| 5,821,945 A | * | 10/1998 | Yeo et al. | 345/440 |
| 5,831,616 A | * | 11/1998 | Lee | 345/348 |
| 5,870,754 A | * | 2/1999 | Dimitrova et al. | 707/104 |
| 5,969,716 A | * | 10/1999 | Davis et al. | 345/328 |
| 6,021,213 A | * | 2/2000 | Heltebrand et al. | 382/128 |
| 6,119,135 A | * | 9/2000 | Helfman | 707/513 |
| 6,137,499 A | * | 10/2000 | Tesler | 345/440 |
| 6,181,332 B1 | * | 1/2001 | Salahshour et al. | 345/302 |
| 6,211,912 B1 | * | 4/2001 | Shahraray | 348/228 |
| 6,281,983 B1 | * | 8/2001 | Form | 358/403 |

FOREIGN PATENT DOCUMENTS

| | | | |
|---|---|---|---|
| EP | 0805405 | 11/1997 | G06F/17/30 |
| WO | 99/05865 | 2/1999 | H04N/5/93 |

OTHER PUBLICATIONS

"Image Interpretation using Contextual Feedback", G.C. Lai et al., Proceedings of the International Conference on Image Processing (ICIP), US, Los Alamitos, IEEE Comp. Soc. Press, pp. 623–626, XP000624046 ISBN.

"Hierarchy–Based Network Organization, Modeling, and Prototyping of Semantic, Statistic, and Numeric Imaage Information", H.S. Shakir et al., IEICE Transactions on Information and Systems, JP, Institute of Electronics Information and Comm. Eng. Tokyo, vol. E78–D, No. 8, pp. 1003–1020, XP000545633.

(List continued on next page.)

*Primary Examiner*—Jayanti K. Patel
(74) *Attorney, Agent, or Firm*—Fitzpatrick, Cella, Harper & Scinto

(57) ABSTRACT

Digital image signal interpretation is the process of understanding the content of an image through the identification of significant objects or regions in the image and analysing their spatial arrangement. Traditionally the task of image interpretation required human analysis. This is expensive and time consuming, consequently considerable research has been directed towards constructing automated image interpretation systems. A method of interpreting a digital video signal is disclosed whereby the digital video signal has contextual data. The method comprising the steps of firstly, segmenting the digital video signal into one or more video segments, each segment having a corresponding portion of the contextual data. Secondly, analysing each video segment to provide a graph at one or more temporal instances in the respective video segment dependent upon the corresponding portion of the contextual data.

44 Claims, 11 Drawing Sheets

OTHER PUBLICATIONS

"Segmentation of Video By Clustering and Graph Analysis", M. Yeung et al., Computer Vision and Image Understanding, U.S. Academic Press, vol. 71, No. 1, pp. 94–109, XP000766005.

"Stochastic Relaxation, Gibbs Distributions, and the Bayesian Restoration of Images", S. Geman et al. IEEE Trans. Pattern Analysis and Machine Intelligence, vol. 6, pp. 721–724, Sep., 1984.

"A Markov Random Field Model Based Approach To Image Interpretation", J.W. Modestino et. al, Markov Random Fileds Theory and Application, pp. 369–408, 1993, Acadamic Press.

* cited by examiner

| Node or Region | Associated Cliques |
|---|---|
| R1 | {R1}, {R1, R2}, {R1, R3} |
| R2 | {R2}, {R2, R4}, {R2, R8}, {R2, R4, R8} |
| R3 | {R3}, {R3, R4}, {R3, R7}, {R3, R4, R7} |
| R4 | {R4}, {R4, R5}, {R4, R6}, {R4, R7}, {R4, R8} |
| R5 | {R5} |
| R6 | {R6} |
| R7 | {R7} |
| R8 | {R8}, {R8, R9} |
| R9 | {R9} |

Fig. 8

AUTOMATED VIDEO INTERPRETATION SYSTEM

FIELD OF INVENTION

The present invention relates to the statistical analysis of digital video signals, and in particular to the statistical analysis of digital video signals for automated content interpretation in terms of semantic labels. The labels can be subsequently used as a basis for tasks such as content-based retrieval and video abstract generation.

DESCRIPTION OF THE PRIOR ART

Digital video is generally assumed to be a signal representing the time evolution of a visual scene. This signal is typically encoded along with associated audio information (eg., in the MPEG-2 audiovisual coding format). In some cases information about the scene, or the capture of the scene, might also be encoded with the video and audio signals. The digital video is typically represented by a sequence of still digital images, or frames, where each digital image usually consists of a set of pixel intensities for a multiplicity of colour channels (eg., R, G, B). This representation is due, in a large part, to the grid-based manner in which visual scenes are sensed.

The visual, and any associated audio signals, are often mutually correlated in the sense that information about the content of the visual signal can be found in the audio signal and vice-versa. This correlation is explicitly recognised in more recent digital audiovisual coding formats, such as MPEG-4, where the units of coding are audiovisual objects having spatial and temporal localisation in a scene. Although this representation of audiovisual information is more attuned to the usage of the digital material, the visual component of natural scenes is still typically captured using grid-based sensing techniques (ie., digital images are sensed at a frame rate defined by the capture device). Thus the process of digital video interpretation remains typically based on that of digital image interpretation and is usually considered in isolation from the associated audio information.

Digital image signal interpretation is the process of understanding the content of an image through the identification of significant objects or regions in the image and analysing their spatial arrangement. Traditionally the task of image interpretation required human analysis. This is expensive and time consuming, consequently considerable research has been directed towards constructing automated image interpretation systems.

Most existing image interpretation systems involve low-level and high-level processing. Typically, low-level processing involves the transformation of an image from an array of pixel intensities to a set of spatially related image primitives, such as edges and regions. Various features can then be extracted from the primitives (eg., average pixel intensities). In high-level processing image domain knowledge and feature measurements are used to assign object or region labels, or interpretations, to the primitives and hence construct a description as to "what is present in the image".

Early attempts at image interpretation were based on classifying isolated primitives into a finite number of object classes according to their feature measurements. The success of this approach was limited by the erroneous or incomplete results that often result from low-level processing and feature measurement errors that result from the presence of noise in the image. Most recent techniques incorporate spatial constraints in the high-level processing. This means that ambiguous regions or objects can often be recognised as the result of successful recognition of neighbouring regions or objects.

More recently, the spatial dependence of region labels for an image has been modelled using statistical methods, such as Markov Random Fields (MRFs). The main advantage of the MRF model is that it provides a general and natural model for the interaction between spatially related random variables, and there are relatively flexible optimisation algorithms that can be used to find the (globally) optimal realisation of the field. Typically the MRF is defined on a graph of segmented regions, commonly called a Region Adjacency Graph (RAG). The segmented regions can be generated by one of many available region-based image segmentation methods. The MRF model provides a powerful mechanism for incorporating knowledge about the spatial dependence of semantic labels with the dependence of the labels on measurements (low-level features) from the image.

Digital audio signal interpretation is the process of understanding the content of an audio signal through the identification of words/phrases, or key sounds, and analysing their temporal arrangement. In general, investigations into digital audio analysis have concentrated on speech recognition because of the large number of potential applications for resultant technology. eg., natural language interfaces for computers and other electronic devices.

Hidden Markov Models are widely used for continuous speech recognition because of their inherent ability to incorporate the sequential and statistical character of a digital speech signal. They provide a probabilistic framework for the modelling of a time-varying process in which units of speech (phonemes, or in some cases words) are represented as a time sequence through a set of states. Estimation of the transition probabilities between the states requires the analysis of a set of example audio signals for the unit of speech (ie., a training set). If the recognition process is required to be speaker independent then the training set must contain example audio signals from a range of speakers.

SUMMARY OF THE INVENTION

According to one aspect of the present invention there is provided a method of interpreting a digital video signal, wherein said digital video signal has contextual data, said method comprising the steps of:

segmenting said digital video signal into one or more video segments, each segment having a corresponding portion of said contextual data; and analysing each video segment to provide a graph at one or more temporal instances in the respective video segment dependent upon said corresponding portion of said contextual data.

According to another aspect of the present invention there is provided an apparatus for interpreting a digital video signal, wherein said digital video signal has contextual data, said apparatus comprising:

means for segmenting said digital video signal into one or more video segments, each segment having a corresponding portion of said contextual data; and means for analysing each video segment to provide an analysis token for one or more regions contained in the respective video segment dependent upon said corresponding portion of said contextual data.

According to still another aspect of the present invention there is provided a computer program product comprising a computer readable medium having recorded thereon a computer program for interpreting a digital video signal, wherein said digital video signal has contextual data, said computer program product comprising:

means for segmenting said digital video signal into one or more video segments, each segment having a corresponding portion of said contextual data; and means for analysing each video segment to provide an analysis token for one or more regions contained in the respective video segment dependent upon said corresponding portion of said contextual data.

BRIEF DESCRIPTION OF THE DRAWINGS

The embodiments of the invention are described hereinafter with reference to the drawings, in which:

FIG. 8 illustrates cliques associated with the RAG of FIG. 3B;

DETAILED DESCRIPTION

1. Overview

Figure 1:
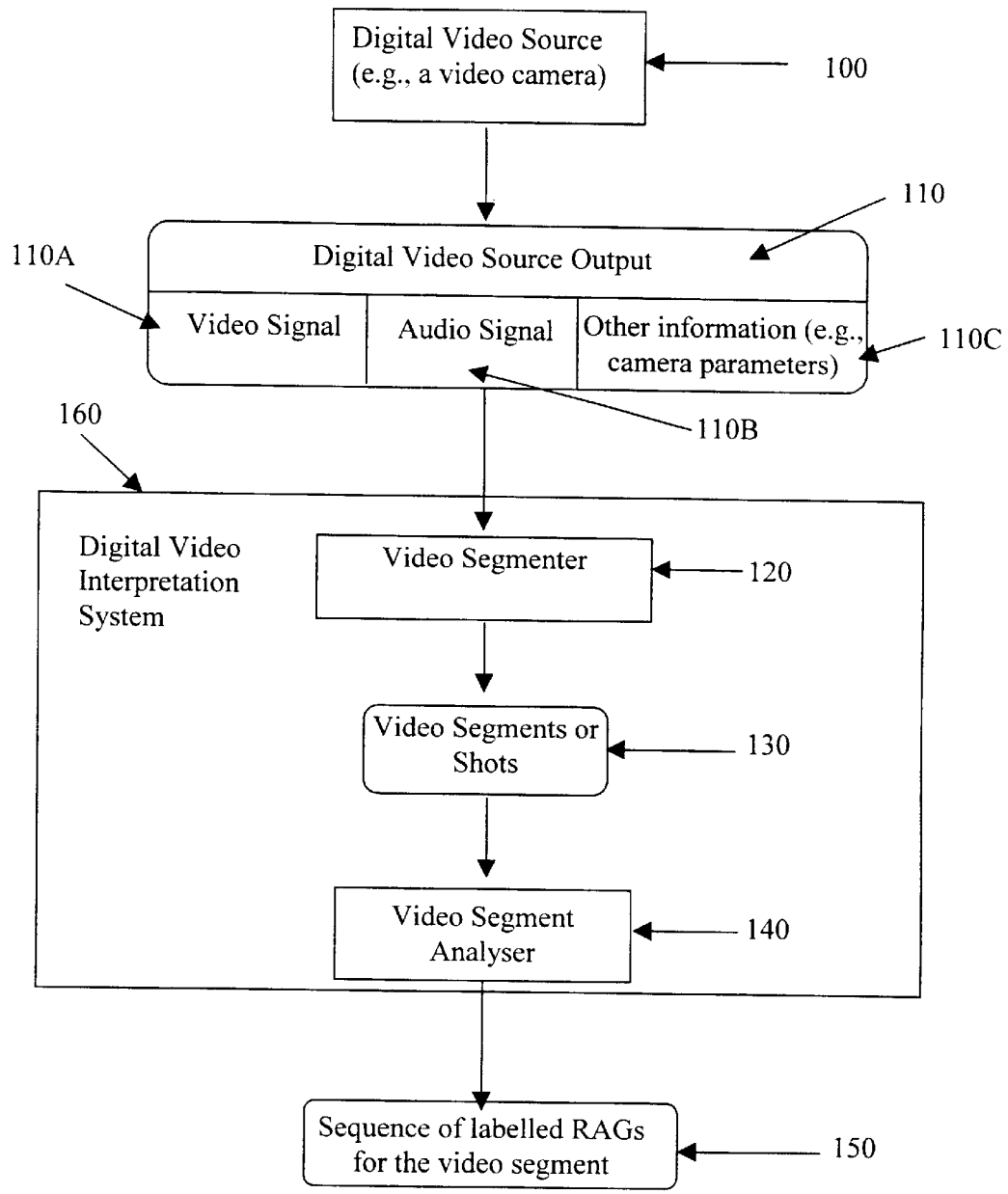
FIG. 1 is a block diagram of a digital video interpretation system according to the preferred embodiment.

The present invention relates to a method, apparatus and system for automatically generating an abbreviated high-level description of a digital video signal that captures (important) semantic content of the digital video signal in spatial and time domains. Such descriptions can subsequently be used for numerous purposes including content-based retrieval, browsing of video sequences or digital video abstraction.

A digital video signal is taken to be the visual signal recorded in a video capture device. The signal would generally, but not necessarily, be generated from a two-dimensional array of sensors (eg., CCD array) at a specified sampling rate with each sample being represented by a (video) frame. The analysis of the spatial and temporal content of this signal can benefit from a range of contextual information. In some cases this contextual information is implicit within the digital video signal (eg., motion), and in other cases the information may be available from other associated sources (eg., the associated audio signal, recorded camera parameters, other sensors apart from the generally used visual spectrum sensors). The extent of the available contextual information is much greater than that available to a still image analysis process and has the additional property of time evolution.

The time evolution of a digital image signal in a video signal can be used to improve the success of the image interpretation process of a digital video signal. For example, motion information can be used to assist in the detection of moving objects, such as people, in the digitally recorded scene. Motion can also be used to selectively group regions in an image frame as being part of the background for a scene. The process of interpreting, or understanding, digital video signals may also benefit from the identification of audio elements (speech and non-speech) in the associated audio signal. For example, words identified in an audio signal may be able to assist in the interpretation process. Also the audio signal associated with a wildlife documentary may contain the sounds made by various animals that may help identify the content of the video signal.

The embodiments of the present invention extend the use of probabilistic models, such as MRFs, to digital video signal interpretation. This involves the repeated use of a probabilistic model through a video sequence to integrate information, in the form of measurements and knowledge, from different sources (eg., video frames, audio signal, etc.) in a single optimisation procedure.

In the embodiments of the invention, a high-level description is generated at selected analysis events throughout the digital video signal. The high-level description is based on an assignment of various semantic labels to various regions that are apparent at the analysis event. At each analysis event, the video frame centred on the analysis event is automatically spatially segmented into homogeneous regions. These regions and their spatial adjacency properties are represented by a Region Adjacency Graph (RAG). The probabilistic model is then applied to the RAG. The model incorporates feature measurements from the regions of the frame, contextual information from a Region of Interest (ROI) around the frame, and prior knowledge about the various semantic labels that could be associated with the regions of the RAG. These semantic labels (eg., "person", "sky", "water", "foliage", etc.) are taken from a list which has been typically constructed for an appropriate application domain (eg., outdoor scenes, weddings, urban scenes, etc).

At each analysis event, the contextual information is used to bias the prior probabilities of the semantic labels (hereinafter labels) in a selected appropriate application domain. The analysis performed at a given analysis event also depends on the previous analysis events. This dependence is typically greater if two analysis events are close together in the time domain. For example, within a video segment, it is likely, but not exclusively, that labels selected for regions at previous recent analysis events are more probable than labels that have not been selected in the description of the current section of digital video.

The digital video interpretation system can operate with a single application domain or multiple application domains. If multiple application domains are being used then contextual information can be used to determine the most probable application domain. The application domains may be narrow (ie., few labels) or broad (ie., many possible labels). Narrow application domains would typically be used if very specific and highly reliable region labelling is required. For example, in a security application, it may be desirable to be able to identify regions that are associated with people and cars, but the identification of these objects might be required with high reliability.

In the following detailed description of the embodiments, numerous specific details such as video encoding techniques, sensor types, etc., are set forth to provide a more thorough description. It will be apparent, however, to one skilled in the art that the invention may be practiced without these specific details. In other instances, well-known features, such as video formats, audio formats, etc., have not been described in details so as not to obscure the invention.

2. Digital Video Interpretation System of the Preferred Embodiment

FIG. 1 illustrates a probabilistic digital video interpretation system 160 according to the preferred embodiment of the invention. The digital video interpretation system 160 comprises a video segmenter 120 and a video segment analyser 140, and processes digital video source output 110 which have been generated from a digital video source 100. Preferably the digital video source is a digital video camera. The video segmenter 120 is coupled between the digital video source 100 and the video segment analyser 140.

The digital video interpretation system 160 may optionally be internally or externally implemented in relation to the digital video source 100. When the digital video interpretation system 160 is located inside the digital video source 100 (eg., a digital camera), the interpretation system 160 can readily make use of additional camera information without having to explicitly store this additional information with the video and audio signals that typical constitute the audiovisual signal. For example, camera motion information in a digital video camera may be used to assist motion analysis of the digital video signal 110A. Further, operator-gaze location could provide information about where key objects in a scene are located and focal information (or other range information) could be used to generate depth information which could be used to generate a depth axis for the RAG as shown in FIG. 3B.

The input to the digital video interpretation system 160 is the digital video source output 110 that is captured using a device such as a digital video camera. The digital video source output 110 is usually composed of a digital video signal 110A and a digital audio signal 110B. Additional information 110C about the recorded scene may also be available depending on the capture device. Additional information 110C could include camera parameters (such as focus information, exposure details, operator-gaze location, etc.) and other sensor information (eg., infrared sensing).

In the digital video interpretation system 160, the video segmenter 120 segments the digital video signal into temporal video segments or shots 130 provided at its output. The resulting video segments 130 produced by the video segmenter 120 are provided as input to the video segment analyser 140. The video segment analyser 140 produces a sequence of labelled RAGs for each video segment 130.

The video segment analyser 140 of FIG. 1 generates and then attempts to optimally label regions in a sequence of RAGs using one or more appropriate application domains. The resulting sequence of label RAGs 150 represents a description of the content of the digital video signal 110A and is referred to hereinafter as metadata.

Figure 9:
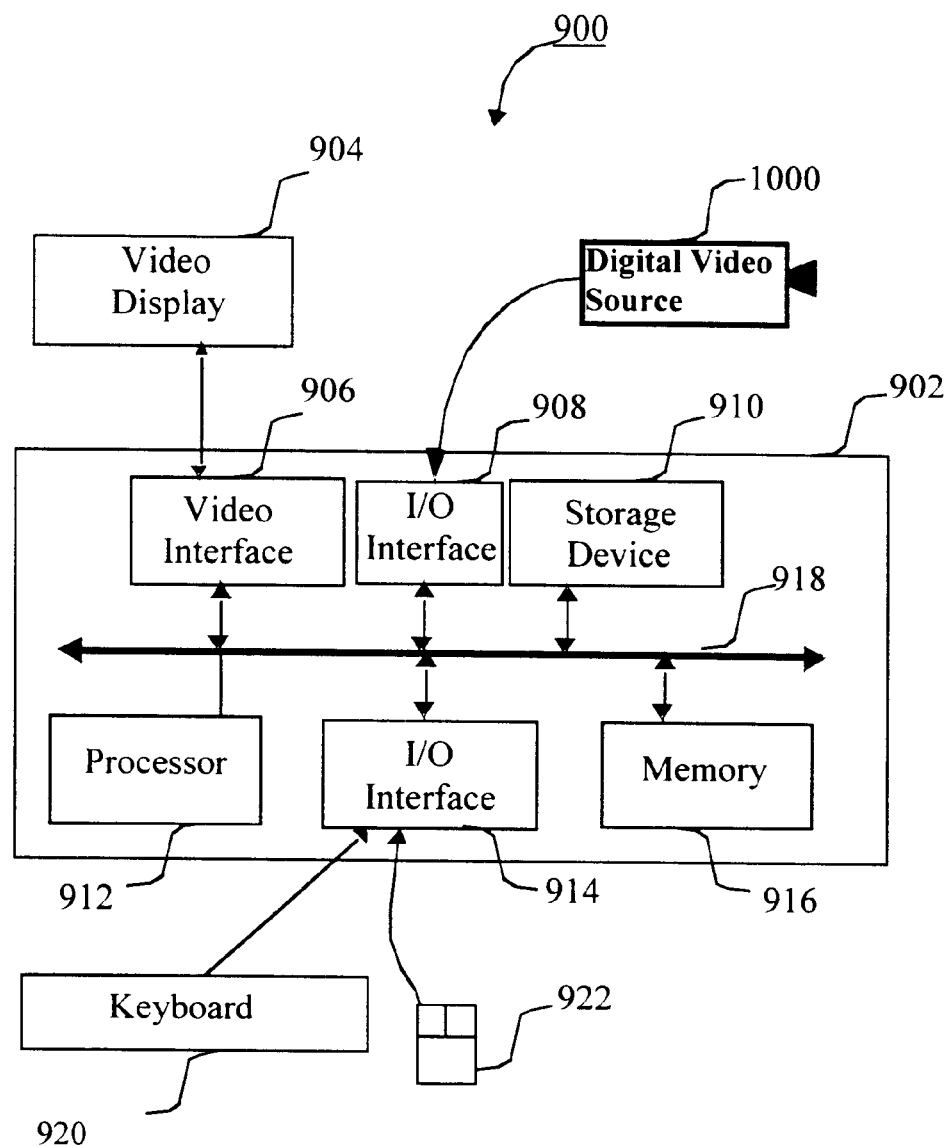
FIG. 9 is a block diagram of a representative computer for use with a digital video source, with which the embodiments of the invention may be practiced.
Figure 10:
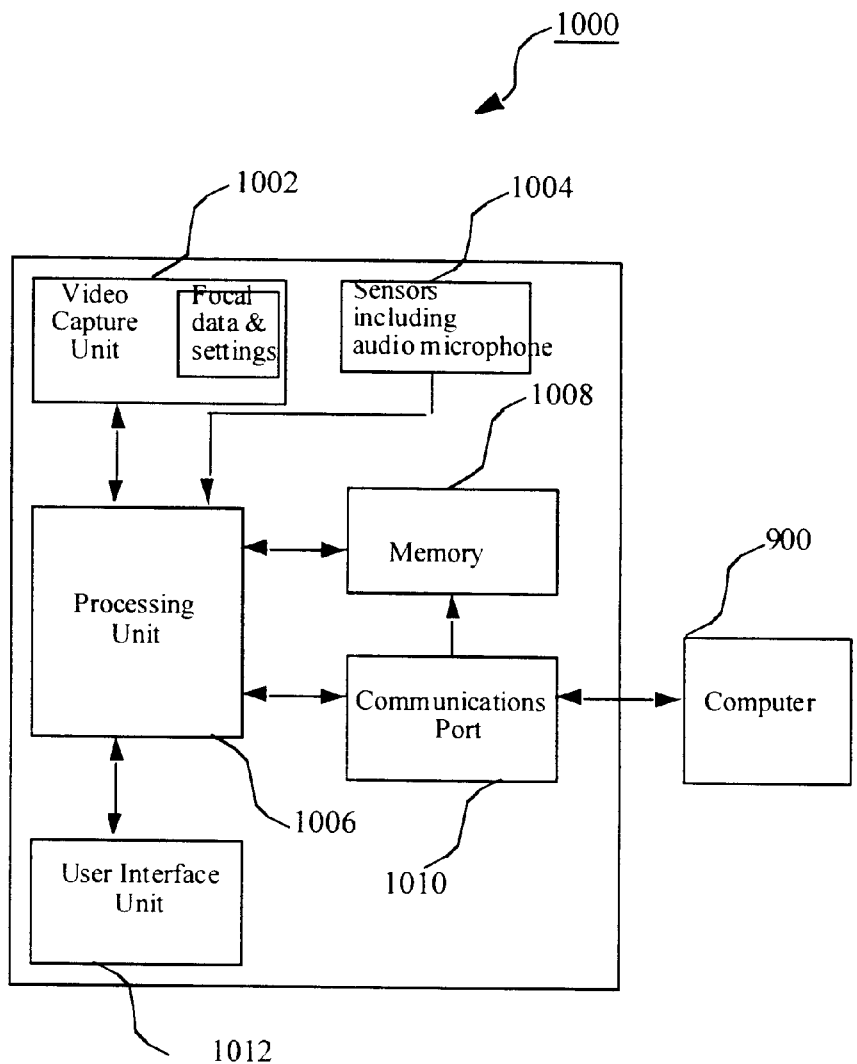
FIG. 10 is a block diagram of a representative digital video source, with which the embodiments of the invention may be practiced.

The embodiments of the invention can be implemented externally in relation to a digital video source as indicated by the computer 900 depicted in FIG. 9. Alternatively the digital video interpretation system may be implemented internally within a digital video source 1000 as depicted in FIG. 10.

With reference to FIG. 9, the general purpose computer is coupled to a remote digital video source 1000. The video interpretation system is implemented as software recorded on a computer readable medium that can be loaded into and carried out by the computer. The computer 900 comprises a computer module 902, video display monitor 904, and input devices 920, 922. The computer module 902 itself comprises at least one central processing unit 912, a memory unit 916 which typically includes random access memory (RAM) and read only memory (ROM), input output (I/O) interfaces 906, 908, 914 including a video interface 906. The I/O interface 908 enables the digital video source 1000 to be coupled with the computer module 902 and a pointing device such as mouse 922. The storage device 910 may include one or more of the following devices: a floppy disc, a hard disc drive, a CD-ROM drive, a magnetic tape drive, or similar non-volatile storage device known to those skilled in the art. The components 906 to 916 of the computer 902 typically communicate via an interconnected bus 918 and in a manner which results in a usual mode of operation of a computer system 900 known to those in the relevant art. Examples of computer systems on which the embodiments of the invention can be practised include IBM PC/Ats and compatibles, Macintosh Computers, SunSparcstations, or any of a number of computer systems well known to those in the art. The digital video source 1000 is preferably a digital camera that is capable of recording a video signal into storage (eg.: memory, magnetic recording media, etc.) and additional information, for instance, infrared data that is associated with the video signal. The digital video signal and any associated additional (contextual) information may be downloaded to the computer 900 where the interpretation and labelling processes are performed in accordance with the embodiments of the invention.

Alternatively, the embodiment of the invention may be practiced internally within a digital video source 1000, which is preferably a digital video camera. The digital video source 1000 comprises video capture unit 1002 (eg., including a charge couple device) for capturing images and having sensors and/or mechanisms for providing focal data and other settings of the video capture unit 1002. The digital video source 1000 may also include sensors 1004 for capturing audio information, ambient and/or environmental data, positioning data (eg., GPS information) etc. The sensors 1004 and the video capture unit 1002 are connected to a central processing unit of the digital video source 1000, with which the embodiments of the invention may be practiced. The processing unit 1006 is coupled to memory 1008, communications for 1010, and a user interface unit 1012. The user interface unit 1012 allows the operator of the video source 1000 to specify numerous settings in operational modes of the digital video source 1000. For example, the digital video source operator may select different application domains (eg., Outdoor Scenes, Urban Scenes, Wedding Scenes, etc.) to use with the interpretation system. Application domains could be downloaded to the capture device, electronically or via a possible wireless link. The memory 1008 may comprise random access memory, read only memory, and/or non-volatile memory storage devices. Both data and processing instructions for operating the processing unit may be stored in the memory 1008. The communications port 1010 permits communications between the digital video source 1000 with external devices such as a computer 900 of FIG. 9. The communications port 1010 is capable of transmitting and receiving data and instructions to both the memory 1008 and the processing unit 1006.

3. Video Segmenter of the Preferred Embodiment

The video segmenter 120 segments the digital video signal into temporal video segments or shots 130. Information regarding the motion of pixels in a frame (implicit within the digital video signal 110A) and/or any other supporting information that may be available in the digital audio signal 110B or other information 110C can be used to assist the segmentation by the video segmenter 120. For example, if information about when an operator started and stopped recording was available then the video segmentation could be based on this information. Known video segmentation techniques can be implemented in the video segmenter without departing from the scope and spirit of the invention.

4. Video Segment Analyser of the Preferred Embodiment

The video segment analyser 140 generates a sequence of labelled RAGs 150 for each video segment 130. The RAGs are preferably three-dimensional with range information being obtained from the digital video source 100 shown in FIG. 1. Each RAG consists of a set of disjoint regions and a set of edges connecting the regions. Regions that are located in the same X-Y plane are assumed to be coplanar. In contrast regions located in different Z planes are assumed to correspond to regions at different depths in the depicted scene. In general, the use of the depth axis (e.g., Z-axis) in the RAG depends on the availability of information to indicate that a particular region is located at a different depth than one or more other regions. For example, the depth axis can be utilised in a digital video interpretation system 160 in which focal information, or depth information, is available to determine the depth of particular regions. However, the video segment analyser 140 can generate a sequence of labelled RAGs 150, without the aid of depth information treating substantially all disjointed regions as being coplanor.

Figure 2:
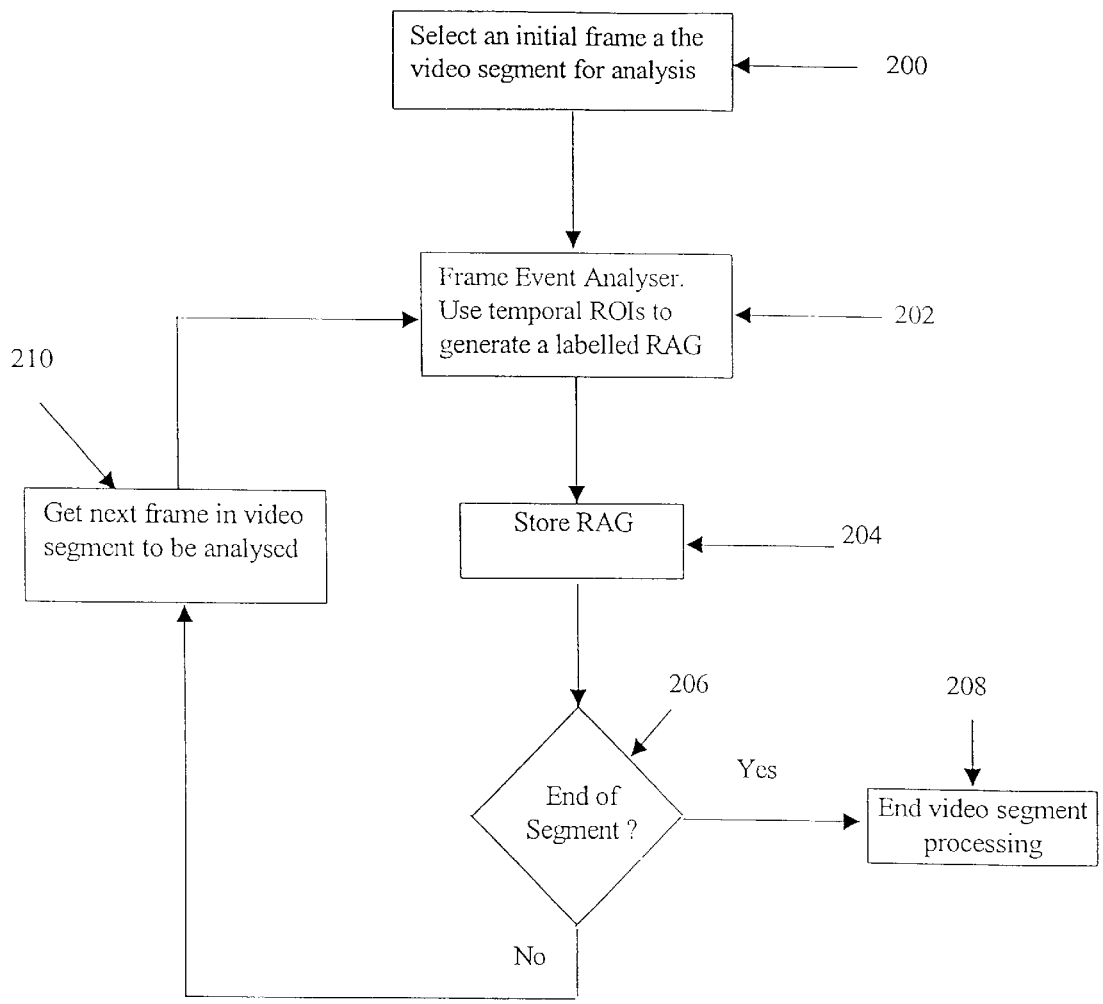
FIG. 2 illustrates the video segment analyser of FIG. 1 according to the preferred embodiment.

FIG. 2 shows the video segment analyser 140 according to the preferred embodiment. In block 200 an initial frame in a video segment 130 from the video segmenter 120 of FIG. 1 is selected for analysis. A frame event analyser 202 receives the selected frame and temporal region of interests (ROIs) for that frame, as described hereinafter with reference to FIG. 6, and generates a labelled RAG. Next, in block 204, the generated RAG is stored and a decision block 206 is used to determine if the end of the video segment 130 has been reached. If the end of the video is reached, that is the decision block 206 returns true (yes), video segment processing terminates in block 208. Otherwise the decision block 206 returns false (no), a next frame to be analysed in the 25 video segment 130 is retrieved and processing returns back to the frame event analyser 202. Preferably, each frame of a video segment 130 is selected and analysed in real-time. However, in practise the selection of frames to be analysed depends upon the application in which the digital video interpretation system is used. For example, real-time performance may not be possible when analysing each frame in some devices, comprising the digital video interpretation system, in which case only predetermined frames of a video segment are selected for analyses.

Figure 3A:
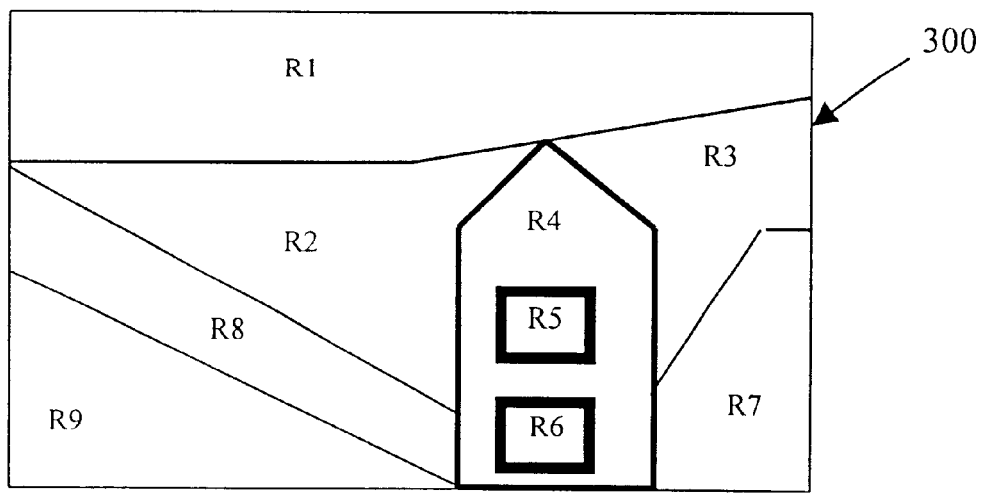
FIGS. 3A and 3B illustrate a representative segmented image and a corresponding region adjacency graph (RAG), respectively, in accordance with the embodiments of the invention.
Figure 3B:
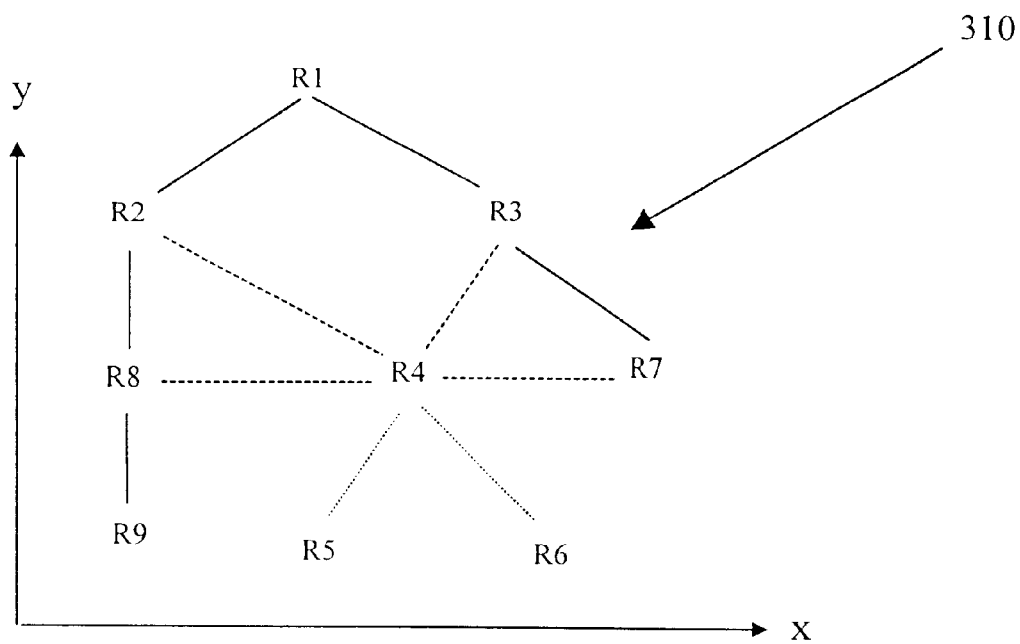

FIG. 3B is an example of a three-dimensional RAG 310 for the spatially segmented frame 300 shown in FIG. 3A. The spatially segmented frame 300 contains nine regions named R1 to R9. The region R1 contains sky. The regions R2, R3, and R9 contain land and the region R8 is a road. The region R4 is a house-like structure, and the regions R5 and R6 are projecting structures in the house. To indicate depth in FIG. 3A, border of regions are indicated with several thicknesses. In particular, the thickness of the respective borders indicate the frontedness of depth in the Z axis. The RAG 310 indicates connected edges of regions R1 to R9 in the segmented frame 300. The regions R1, R2, R3, R7, R8 and R9 are all located at the same approximate depth (as indicated by solid edge lines) in the RAG 310 but at different X-Y positions. The region R1 is sequentially connected to regions R2, R8, R9 on the one hand and to regions R3 and R7 on the other hand. In turn, the region R4 has an edge with region R2, R3, R7 and R8, but has a different depth as indicated by dashed or broken edge lines. Finally, the regions R5 and R6 share an edge with the region R4 but at a different, parallel depth indicated by dotted edge lines. Thus, the dashed and dotted lines cross different Z-planes.

5. Frame Event Analyser

The functionality of the frame event analyser 202 of FIG. 2 is described in greater detail with reference to FIG. 4 and FIG. 5. The steps of the frame event analyser shown in FIG. 4 uses a single application domain (eg., outdoor scenes). Such an application domain could contain the knowledge and functionality to label frame regions, such as sky, water, foliage, grass, road, people, etc.

Figure 4:
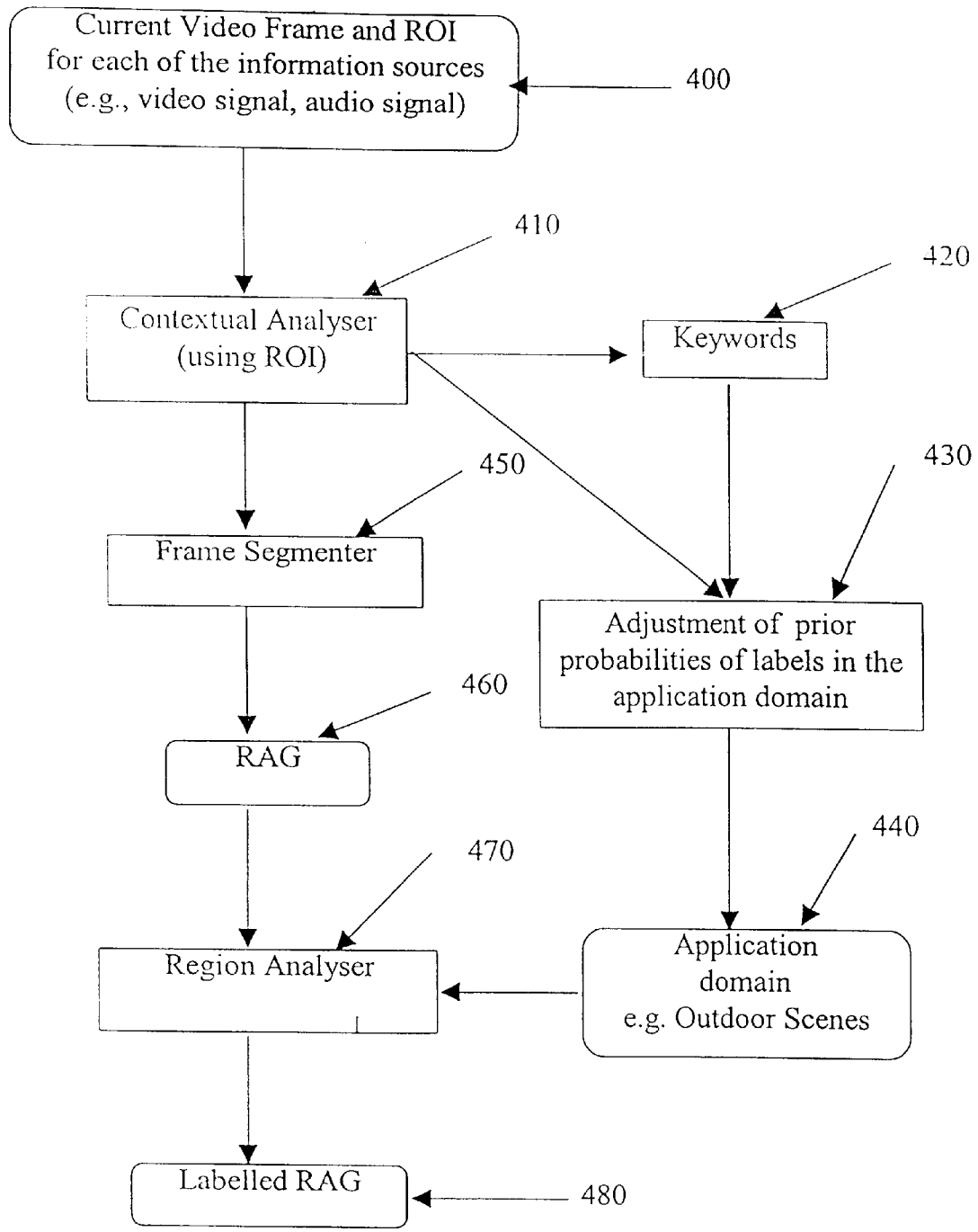
FIG. 4 illustrates a frame event analyser of FIG. 2 and having a single application domain.

In FIG. 4, the current frame and ROIs 400 for each of the information sources (eg., the digital video signal, digital audio signal, etc.) are provided to a contextual analyser 410 that uses the ROIs 400. In addition to the contextual analyser 410, the frame event analyser 202 of FIG. 2 comprises a frame segmenter 450, an adjustment unit 430 for adjusting prior probabilities of labels in an application, and a region analyser 470.

The contextual information 400 available in a ROIs is analysed by a contextual analyser 410. Since there are multiple sources of contextual information, the contextual analyser 410 typically includes more than one contextual analysing unit.

Figure 7:
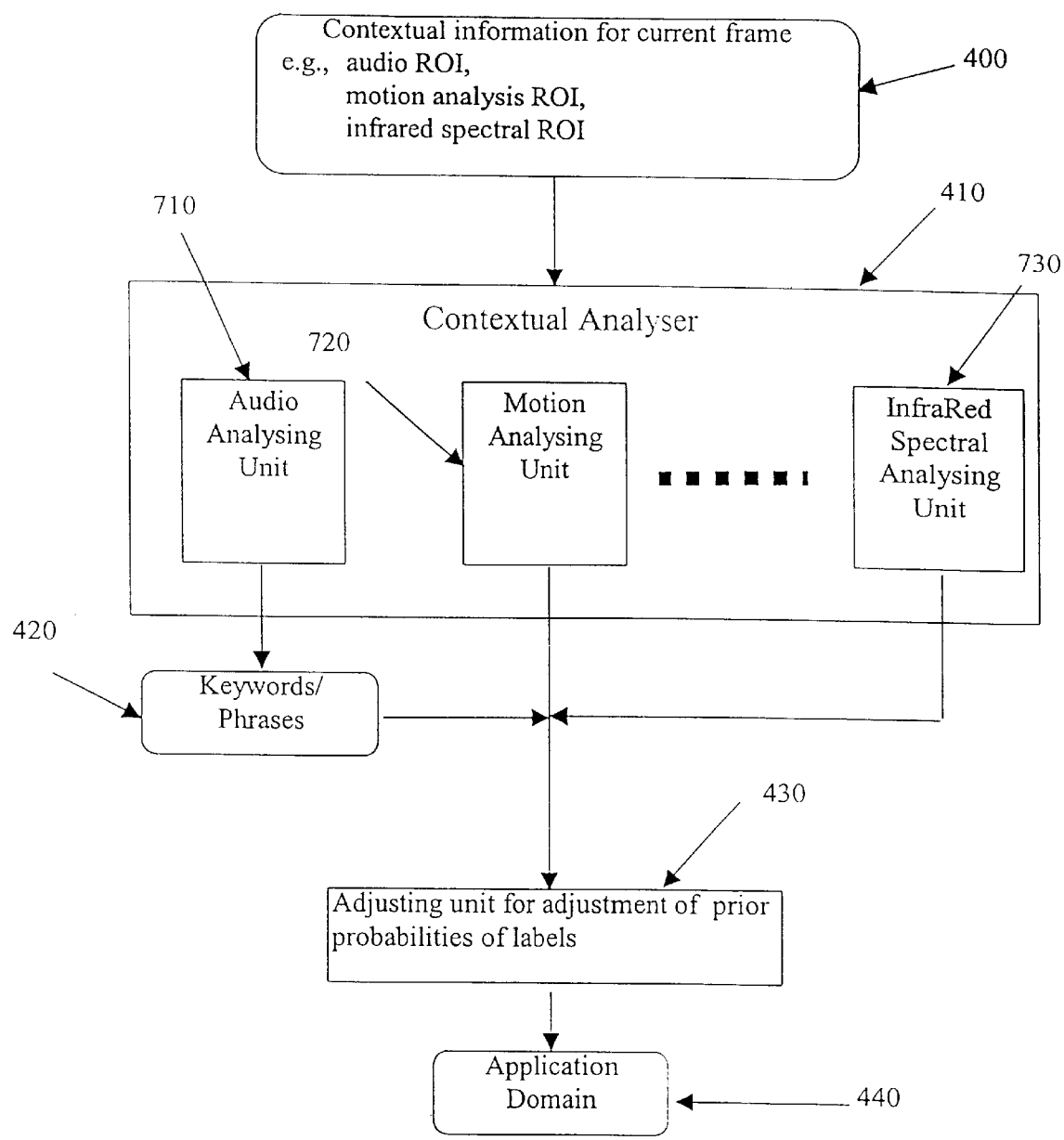
FIG. 7 illustrates a preferred contextual analyser for use in the frame event analyser of FIG. 4 or FIG. 5.

A more detailed illustration of the contextual analyser 410, is provided in FIG. 7 in relation to the adjusting unit 430 and the application domain 440. The contextual analyser 410 shown in FIG. 7 receives contextual information 400 for the frame event, which preferably comprises and audio ROI, a motion analysis ROI and/or an infrared spectral ROI. The contextual analyser 410 itself may include an audio analysing unit 710, a motion analysing unit 720, and an infrared analysing unit 730. The outputs produced by the contextual analyser 410 are used by the adjustment unit 430 to alter the prior probabilities of the labels in the application domain 440 used by the region analyser 470 of FIG. 4. The audio analysing unit 710 may achieve this result by recognising key words or phrases in the digital audio signal located in the audio signal ROI and then checking to see whether these key words/phrases suggest that any particular label(s) are more likely to occur in the frame than other labels. Other contextual analyser units (eg., 720, 730) may directly alter the prior probabilities of the labels.

In the preferred embodiment having a frame event analyser 210 with a single application domain 440, the prior probabilities for the labels may be adjusted by the adjusting unit 430 on the basis of a list of key words/phrases 420 being stored for each label in the application domain 440 with a prior probability-weighting factor for each key word/phrase. The higher the probability-weighting factor is, the more likely that a region described by that label exists in the frame. Other contextual analysis results may also be provided to the adjusting unit 430, in addition to or in place of key words 420.

The frame segmenter 450 segments a frame into homogeneous regions using a region-based segmentation method. Typically, the segmentation method uses contextual information extracted from the ROIs of the different information sources (eg., video 110A and audio 110B) to assist the segmentation process. For example, motion vectors can assist in the differentiation of moving objects from a background. If focal information is available then this information can be used to estimate distances and therefore differentiate between different object or region planes in the frame. The result of the segmentation process carried out by the frame segmenter 450 is a RAG 460, such as that shown in FIG. 3, which is provided as input to the region analyser 470. Preferably this RAG is three-dimensional. The other input to the region analyser 470 is the application domain 440 in which the prior probabilities of the labels may have been adjusted depending on the contextual information.

The probabilistic-model-based region analyser, 470, labels optimally the regions in the RAG using the appropriate application domain, 440. The resulting labelled RAG represents a description of the content of the frame, or metadata, that can be used for higher-level processes, such as content-based retrieval. Preferably the region analyser uses an MRF (probabilistic) model to produce the labelled RAG 480. The MRF model is described in detail in the following paragraphs.

Figure 5:
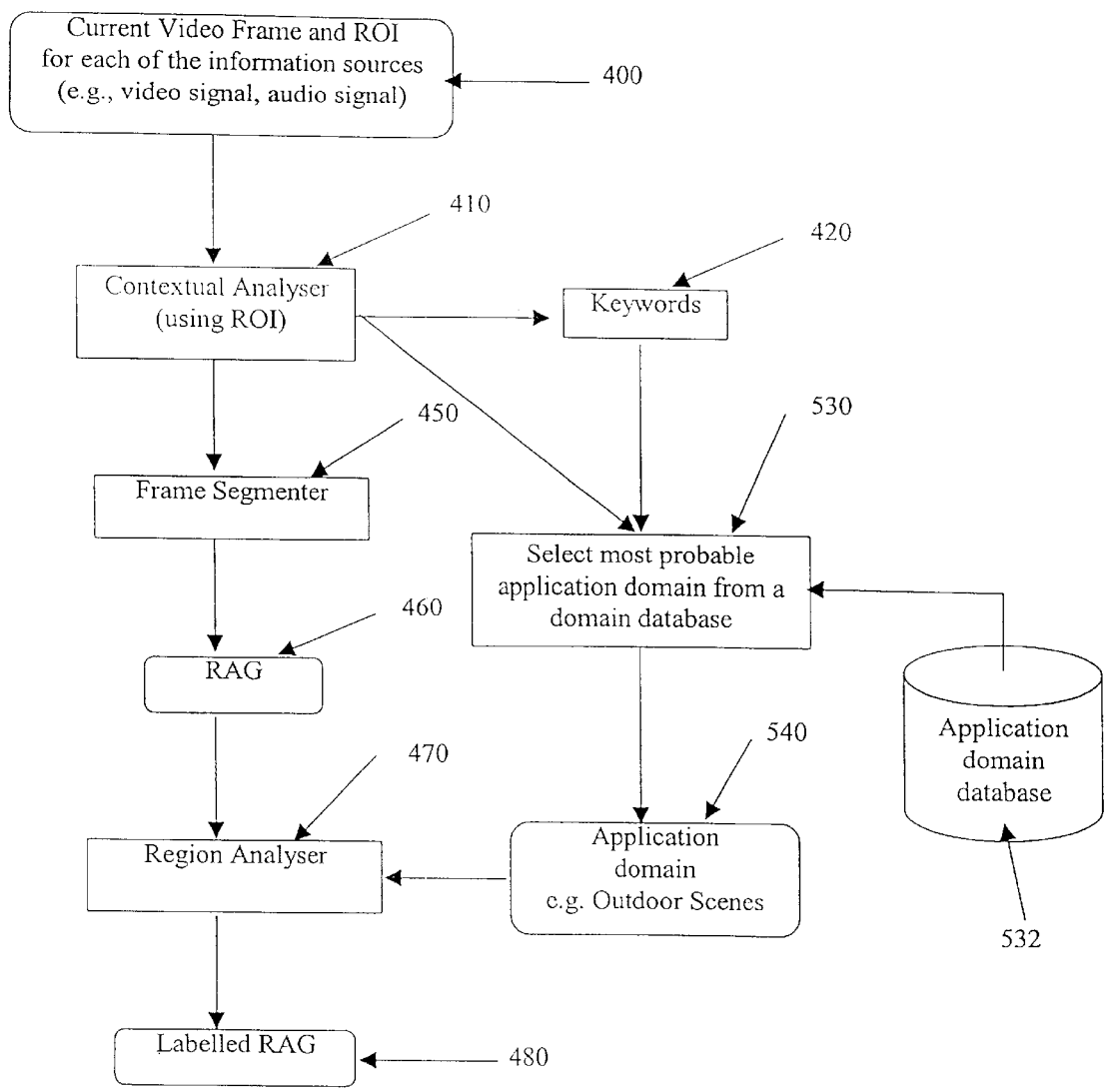
FIG. 5 illustrates an alternative frame event analyser of FIG. 2 and having multiple application domains.

Turning to FIG. 5 there is shown a frame event analyser which can be described in a substantially similar manner to that of FIG. 4, excepting that the frame event analyser now has multiple application domains. In a frame event analyser having multiple application domains (ie., as depicted in FIG. 5), each application domain could contain a list of key words/phrases and the role of a selecting unit 530 can include the selection of an application domain to be used in the analysis. Thus, the selecting unit 530 selects a most probable application domain and preferably adjusts prior probabilities of labels in the select domain.

Figure 6:
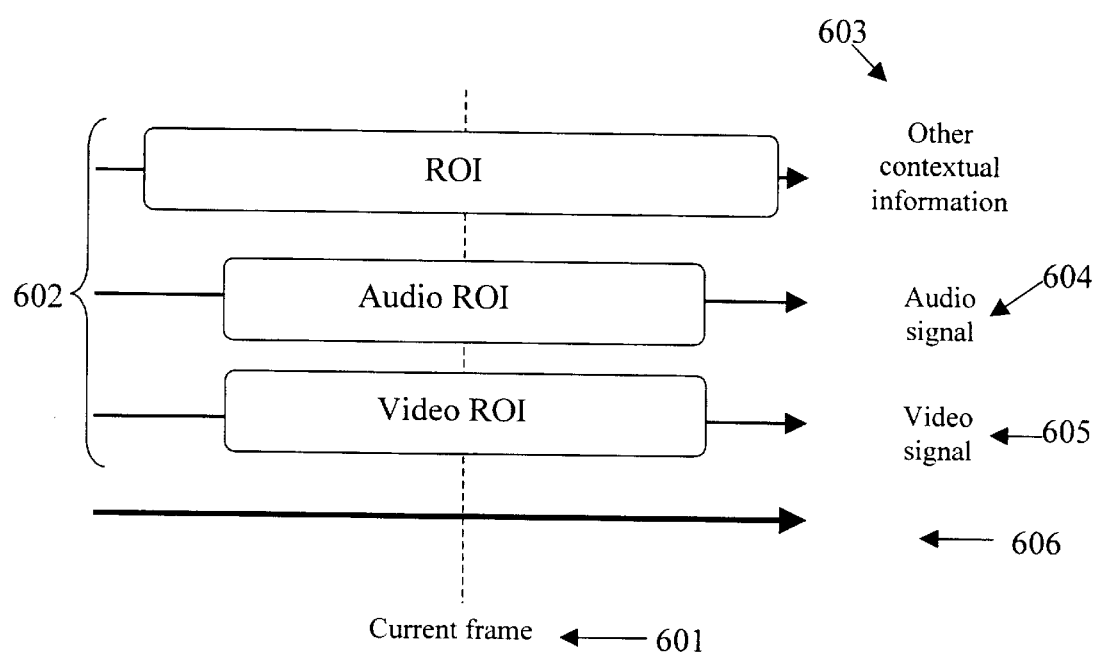
FIG. 6 illustrates the selection of a temporal region of interest (ROI) for a particular analysis event.

Referring to FIG. 6, there is shown a time-line 600 for a video segment. A current frame 601 of the video segment is analysed with reference to one or more regions of interest (ROIs) 602 extracted from available contextual information 603, audio information 604 (signal) and video information 605 (signal).

Temporal boundaries of the ROIs may vary with the type of contextual information (see FIG. 6). For example, contextual information such as camera paramaters, may extend over a large temporal period, maybe the entire video segment. In contrast, the ROI for the video signal may be much shorter, maybe several frames before and after the frame being currently analysed. ROIs are not necessarily centred over the current frame, as shown in FIG. 6. They can, for example, just include previous frames.

Mathematically a RAG is defined to be a graph G which contains a set R of disjoint regions and a set E of edges connecting the regions; G={R, E}. Video frame interpretation seeks optimally label the regions in G. If an application domain consists of a set of p labels, L={$L_1, L_2, L_3, \ldots, L_p$} with prior probabilities, $Pr_L$={$Pr_{L1}, Pr_{L2}, Pr_{L3}, \ldots, Pr_{Lp}$}, which have been biased by an analysis of the contextual information, then the interpretation process can be viewed as one of estimating the most probable set of labels on the graph G.

If the graph G consists of N disjoint regions, then let X={$X_1, X_2, X_3, \ldots, X_N$} be a family of random variables on the RAG. That is, X is a random field, where $X_i$ is the random variable associated with $R_i$. The realisation $x_i$ of $X_i$ is a member of the set of labels, L. A neighbourhood system Γ on G is denoted by:

$$\Gamma = \{n(R_i); 1 \leq i \leq N\} \quad (1)$$

where $n(R_i)$ is a subset of R that contains neighbours of $R_i$. Preferably, a neighbourhood system for a region $R_i$ is that region and all other regions which have some common boundary with $R_i$.

Further, Ω is the set of all possible labelling configurations, ω denotes a configuration in Ω:

$$\Omega = \{\omega = \{x_1, x_2, x_3, \ldots, x_N\}: x_i \in L, 1 \leq i \leq N\} \quad (2)$$

Then X is a MRF with respect to the neighbourhood system Γ if:

P(X=ω)>0, for all realisations of X;

$$P(X_i=x_i|X_j=x_j, R_i \neq R_j)=P(X_i=x_i|X_j=x_j, R_j \in n(R_i)). \quad (3)$$

An important feature of the MRF is that its joint probability density function, P(X=ω), has a Gibbs distribution.:

$$P(X=\omega)=Z^{-1}\exp[-U(\omega)/T], \quad (4)$$

where T is the temperature, and U(ω) is the Gibbs energy function. The partition function Z is given as follows:

$$Z = \sum_\omega \exp[-U(\omega)/T]. \quad (5)$$

The energy function can be expressed using the concept of "cliques". A clique c, associated with the graph G, is a subset of R such that it contains either a single region or several regions that are all neighbours of each other. The cliques for each region in the RAG depicted in FIG. 3B are listed in FIG. 8. The region R1 has associated cliques {R1}, {R1, R2}, and {R1, R3}, for example.

The set of cliques for the graph G is denoted C. A clique function $V_c$ is a function with the property that $V_c(\omega)$ depends on the $x_i$ values (ie., labels) for which (i∈c). Since a family of clique functions is called a potential, U(ω) can be obtained by summing the clique functions for G:

$$U(\omega) = \sum_{c \in C} V_c(\omega). \quad (6)$$

Region-based feature measurements obtained from the frame and prior knowledge are incorporated into the clique functions $V_c$. The likelihood of a particular region label $L_i$ given a set of region feature measurements can be estimated using various methods which could involve the use of a training set (eg., neural networks) or may be based on empirical knowledge. Similarly, prior knowledge can be incorporated into the clique functions $V_c$ in the form of constraints that may or may not be measurement-based. For example, the constraints may be of the form that label $L_i$ and $L_j$ cannot be adjacent (i.e., have zero probability of being neighbours). Alternatively, if $L_i$ and $L_j$ are adjacent, the boundary is likely to have certain characteristics (eg., fractal dimension), and the value of the constraint might depend on a measurement.

Equations 4 to 6 show that minimising the Gibbs U( ) energy for a configuration is equivalent to maximising its probability density function. The preferred embodiment of the invention seeks to find an optimum region label configuration given measurements obtained from the frame M, prior knowledge about the labels K and the prior probabilities of the labels in the application domain Pr. The prior probabilities of the labels are biased by an analysis of contextual information. The problem of optimising the labels over the entire RAG (of the frame) can be solved by iteratively optimising the label at any site, i. The dependence of the label at region i on M, K and Pr is incorporated into the designed clique functions $V_c(\omega)$. Therefore the conditional probability density function for $X_i$ being $X_i$ at site i can be written as:

$$P(X_i = x_i | X, M, K, Pr) = Z_i^{-1} \exp\left[-\frac{1}{T} \sum_{c \in C_i} V_c(\omega)\right], \quad (7)$$

$$Z_i = \sum_{x \in L} \exp\left[-\frac{1}{T} \sum_{c \in C_i} V_c(\omega^x)\right],$$

where $C_i$ is the subset of C that consists of cliques that contain $X_i$ and $\omega^x$ denotes the configuration which is x at site i and agrees with $\omega$ everywhere else. The prior probabilities of the labels can also be used to bias the initial labels of the sites. For example, labels of previous analysis events could be used to initialise a graph for a later analysis event.

As mentioned above, clique functions can be based on feature measurements from the frame M, prior knowledge about the labels K, and prior probabilities of the labels Pr. Consider, for example, the label "sky" in an Outdoor Scenes application domain. The set of cliques involving region (site) i on the RAG (i.e., $C_i$) would typically consist of a unary clique consisting of just region i and a set of cliques that involve groups of regions, each including region i, in which each region is a neighbour of each other region in the group.

The unary clique function could be calculated by measuring a collection of features for the region i and then using these feature measurements as input to a neural network that has been previously trained using examples of sky regions from manually segmented images. Examples of possible features which could be measured for a region include mean R, G and/or B values, mean luminance, variance of the luminance in the region, texture features which may involve measurements derived in the frequency domain, and region shape features such as compactness. The neural network would typically be trained to generate a low value (eg., zero) for regions that have feature measurements that resemble those of the manually segmented sky regions and a high value (eg., 1.0) for those regions that have feature measurements which are very dissimilar to those of the manually segmented regions.

Feature measurements can also be used in clique function which involve more than one region. For example, the tortuosity of a common boundary between two region could be used in a clique function involving a pair of regions. For example, the common boundary between a "sky" and a "water" region would typically not be very tortuous whereas the common boundary between "foliage" and "sky" could well be very tortuous.

Prior knowledge can be incorporated into the clique functions in the form of constraints. For example, a clique function involving a "sky" label and a "grass" label might return a high energy value (eg., 1.0) if the region to which the "grass" label is being applied is above the region to which the "sky" label is being applied. In other words, we are using our prior knowledge of the fact that the "sky" regions are usually located above the "grass" regions in frames.

The prior probability of region i being "sky", $Pr_{Sky}$, could also be incorporated into clique functions. One method of doing this would be to multiply an existing unary clique function by a factor such as:

$$\left(1 - \alpha\left(\frac{Pr_{Sky}}{\arg\max_{L \in L} Pr_L}\right)\right), \quad (8)$$

where is some parameter in the range of (0,1) that weights the contribution of the prior probability to the overall clique function. Prior probabilities could also be incorporated into clique functions involving more than one region. In this case, the multiplying factor or the clique function would typically involve the prior probabilities of each of the labels in the clique function.

Equation 7 demonstrates that selecting the most probable label at a site is equivalent to minimising the weighted, by prior probability of the label, Gibbs energy function $U(\omega)$ at the site. The optimum region label configuration for the frame can be obtained by iteratively visiting each of the N sites on the graph G and updating the label at each site. There exist several methods by which the region labels are updated. A new label can be selected for a region from either a uniform distribution of the labels or from the conditional probability distribution of the MRF (i.e., the Gibbs Sampler, see Geman and Geman, *IEEE Trans. Pattern Analysis and Machine Intelligence*, 6, pp. 721–741, 1984). If more rapid convergence is desirable, then the iterated conditional modes (described by Besag, J., *J. R. Statistical Soc. B*, 48, pp.259–302, 1986) method may be used. In the latter method, sites on the RAG are iteratively visited and, at each site, the label of the region is updated to be the label that has the largest conditional probability distribution. The iterative procedure of visiting an updating sites sites can be implemented within a simulated annealing scheme (where the temperature is gradually decreased). The method of updating is not critical for this embodiment of the invention. Instead, it is the inclusion of the prior probability in the calculation of the Gibbs energy $U(\omega)$ that is a critical.

6. Contextual Analyser

The contextual analyser 410 in FIG. 4 takes the current frame and a ROI 400 for each of the information sources (eg., video signal 110A, and audio signal 110B) and provides information to the adjusting unit 430 on how the prior probabilities of the labels in the application domain 440 should be biased. The function of the contextual analyser 410 as depicted in FIG. 5 has already been discussed in association with the frame event analyser 202 of FIG. 2. A method of adjusting the prior probabilities of labels in an application domain 440 based on the presence of various key words/phrase in the audio signal ROI will be described in more detail hereinafter. Similar methods can be used for other contextual information Each label can be associated with one or more evidence units, where an evidence unit comprises a key word or phrase and a weight factor between 0 and 1. For example, an evidence unit for the label "water" might consist of the key word "beach" and a weighting factor of 0.8. The value of the weighting factor implies the likelihood that the existence of the key word in the audio ROI indicates that "water" is the appropriate label for at least one region in the RAG.

Before evidence is collected the sum of the prior probabilities of all labels should sum to 1.0. In other words:

$$\sum_{l=1}^{L} Pr_l = 1.0 \quad (9)$$

As evidence is collected from the ROIs of the contextual information, evidence units are instantiated. The weight factors for the different instantiated evidence units for a given label l, can be summed to generate the total evidence for the label, $E_l$.

The $Pr_l$ values for the labels in the application domain 440 can then be calculated using.

$$Pr_l = (1 + E_l)x, \quad (10)$$

where the value of x is obtained by solving:

$$\sum_{l=1}^{L} (1 + E_l)x = 1.0. \quad (11)$$

The resulting $Pr_l$ values can be used directly by the clique functions (see for example Equation 8).

7. Alternative Embodiments of the Invention

Figure 11:
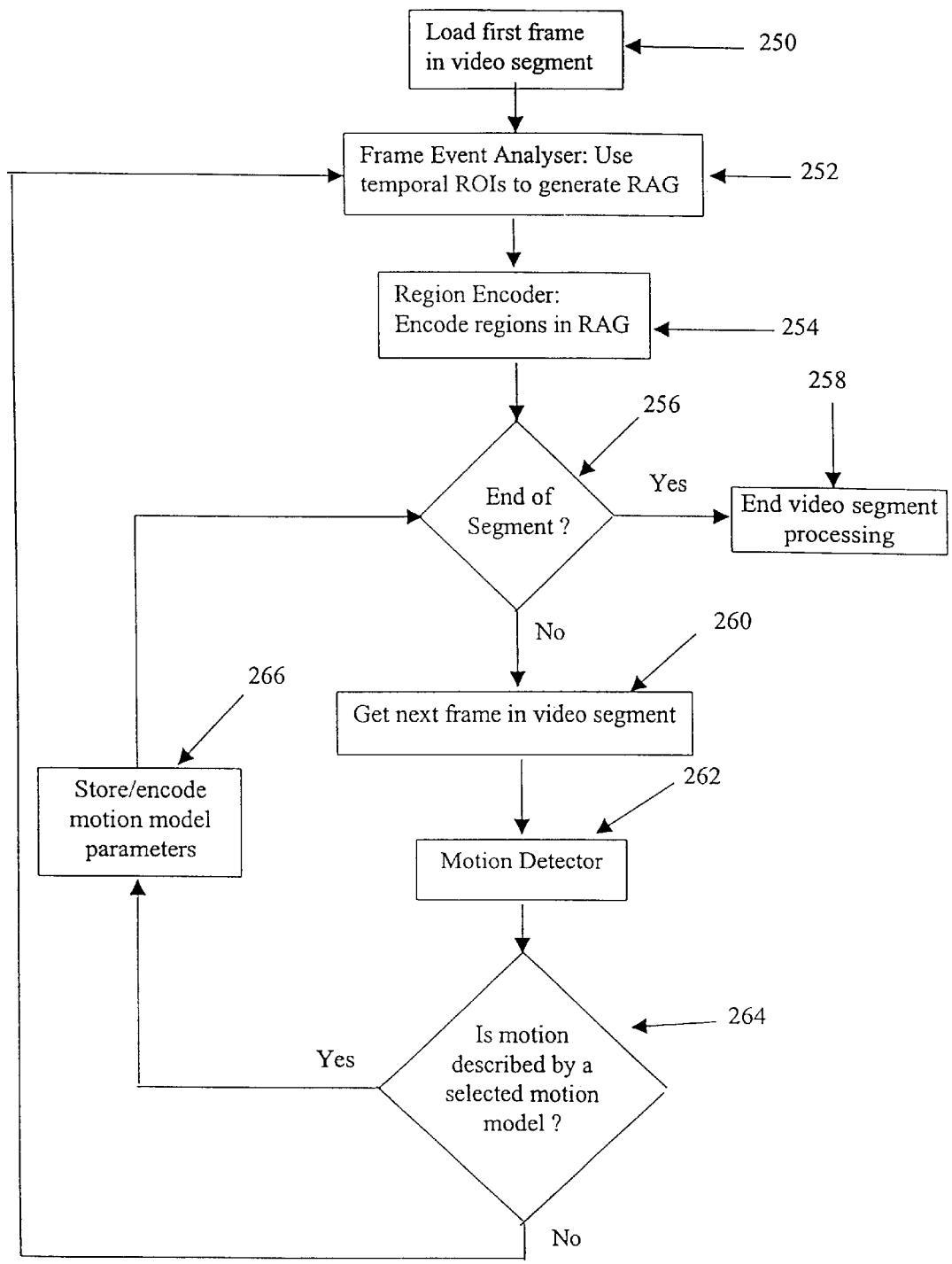
FIG. 11 illustrates the video segment analyser of FIG. 1 according to an alternate embodiment, which is optionally integrated in a digital video coding system.

FIG. 11 shows the video segment analyser 140 according to an alternative embodiment of the invention in which the video segment analyser 140 is integrated with an object-based digital video coding system. In block 250, a first frame in a video segment 130 generated by the video segmenter 120 of FIG. 1 is loaded into the video segment analyser 140. The frame event analyser 252 receives the loaded frame and analyses the frame using the contextual information from the relevant ROI as described for the frame event analyser 202 in FIG. 2A resulting in a labelled RAG. The labelled RAG is then output by the frame event analyser 252 to a region encoder 254 which encodes the RAG. The region encoder 254 encodes the regions of the RAG, including their adjacency and depth information and semantic labels into a bitstream. In block 256, a check is made to determine if the end of the video segment has been reached. If the checking block 256 returns true (yes), then video segment processing terminates in block 258. Otherwise, if checking or decision block 256 returns false (no), the next frame in the video segment is loaded in block 260.

The motion detector 262 detects motion in the video segment on a frame-by-frame basis. It examines any motion, detected from the previous frame, on a region basis. If the motion of individual regions can be described by a motion model (eg., an affine transformation of the region), the model parameters are encoded in the bit stream in block 266. If the detected motion cannot be described by the motion model then the frame is analysed by the frame event analyser 252 and a new RAG is generated and encoded by the region encoder 254.

In the video segment analyser 140 depicted in FIG. 11, the semantic labels are preferably integrated with the coded digital video signal. If the video segment analyser is integrated with the digital video coding system, the regions may be separately coded in a resolution independent manner. This enables simple reconstruction of a digital video signal at any desired resolution. The method of encoding the digital video signal may be carried out using any of a number of such techniques well known to those skilled in the art. Clearly, the video segment analyser 140 does not necessarily need to be integrated with a digital video coding system.

Instead, as noted hereinbefore, the video segment analyser 140 may just generate metadata. In such an embodiment, it may not be necessary to process all the video frames in a segment. In other words, only selected frames in a segment need be analysed. It is not the objective of the embodiments of this invention to specify how frames are selected as such selection depends to a large extent on the implementation. For example, a video interpretation system may need to work close to real-time.

Another alternative embodiment of the invention is one in which the video frame segmentation and region labelling process are combined in a single minimisation process.

What is claimed is:

1. A method of interpreting a digital video signal, wherein said digital video signal has contextual data, said method comprising the steps of:

segmenting said digital video signal into one or more video segments, each segment having one or more video frames, and each said video frame having a corresponding portion of said contextual data;

determining a plurality of regions for a video frame of a respective video segment;

processing said regions for each video segment to provide a region adjacency graph at one or more temporal instances in the respective video segment, said region adjacency graph representing adjacencies between regions for a corresponding frame of said respective video segment; and analyzing said region adjacency graphs to produce a corresponding labeled region adjacency graph comprising at least one semantic label, said analysis being dependent upon a corresponding portion of said contextual data, wherein said labeled region adjacency graph represents an interpretation of said digital video signal.

2. The method according to claim 1, wherein said contextual data comprises information generated by one or more separate sources of said information.

3. The method according to claim 2, wherein the corresponding portion of said contextual data is obtained from a temporal region of interest for each source of contextual information, said temporal region of interest being relative to a video segment being analyzed.

4. The method according to claim 2, wherein said contextual data includes portions of the video signal.

5. The method according to claim 2, wherein said contextual data includes at least one data type selected from the group consisting of:

audio data;

electromagnetic data;

focal point data;

exposure data aperture data operator gaze location data environmental data;

time lapse or sequential image data;

motion data; and textual tokens.

6. The method according to claim 5, wherein said textual tokens include textual annotation, phrases and keywords associated with at least a portion of a respective video segment.

7. The method according to claim 1 said analyzing step comprising the further sub-step of:

biasing a statistical or probabilistic interpretation model dependent upon said corresponding portion of contextual data.

8. The method according to 7, wherein said biasing step includes the step of selecting a predetermined application domain from a plurality of application domains dependent upon said corresponding portion of contextual data, said application domain comprising a set of semantic labels appropriate for use with said application domain.

9. The method according to claim 7, wherein said biasing step includes the step of adjusting at least one prior probability of a respective one of a plurality of semantic labels in at least one application domain.

10. The method according to claim 7, wherein each said analyzing step is dependent upon said biased statistical or probabilistic interpretation model.

11. The method according to claim 10, wherein each said analyzing step is dependent upon said at least one application domain.

12. The method according to claim 7, wherein each said analyzing step includes the step of analyzing regions of said region adjacency graph using said biased statistical or probabilistic interpretation model to provide said labeled region adjacency graph.

13. The method according to claim 12, wherein said region analysis step is dependent upon adjusted prior probabilities of a plurality of labels to provide said labelled region adjacency graph.

14. The method to claim 7, wherein the statistical or probabilistic interpretation model is a Markov Random Field.

15. The method according to claim 1, further comprising the step of encoding said region adjacency graph to form a bitstream representation of said region adjacency graph.

16. The method according to claim 15, further comprising the step of:
representing motion between two successive video frames using a predetermined motion model comprising encoded parameters.

17. The method according to claim 16, further comprising the step of combining each encoded video segment and respective encoded region adjacency graph to provide a motion encoded digital video signal.

18. The method according to claim 1, further comprising the step of providing metadata associated with each video segment, wherein said metadata includes said region adjacency graphs of each video segment.

19. The method according to claim 1, wherein said analysis step is carried out on a video frame and a temporal region of interest of the respective contextual data.

20. The method according to claim 1, wherein said digital video signal is generated using a digital video recoding device.

21. The method according to claim 20, wherein one or more portions of said contextual data is generated by one or more sensors of said digital video recording device.

22. An apparatus for interpreting a digital video signal, wherein said digital video signal has contextual data, said apparatus comprising:
means for segmenting said digital video signal into one or more video segments, each segment having one or more video frames, and each said video frame having a corresponding portion of said contextual data;
means for determining a plurality of regions for a video frame of a respective video segment;
means for processing said regions for each video segment to provide a region adjacency graph at one or more temporal instances in the respective video, said region adjacency graph representing adjacencies between regions for a corresponding frame of said respective video segment; and
means for analyzing said region adjacency graphs to produce a corresponding labeled region adjacency graph comprising at least one semantic label said analysis being dependent won a corresponding portion of said contextual data, wherein said labeled region adjacency graph represents an interpretation of said digital video signal.

23. The apparatus according to claim 22, further comprising means for biasing a statistical or probabilistic interpretation model dependent upon said corresponding portion of contextual data.

24. The apparatus according to claim 23, wherein said biasing means includes means for selecting a predetermined application domain from a plurality of application domains dependent upon said corresponding portion of contextual data, said application domain comprising a set of semantic labels appropriate for use with said application domain.

25. The apparatus according to claim 23, wherein said biasing means includes means for adjusting at least one prior probability of a respective one of a plurality of semantic labels in at least one application domain.

26. The apparatus according to claim 23, wherein said analysing means utilises said biased statistical or probabilistic interpretation model.

27. The apparatus according to claim 26, wherein said analysing means includes at least one application domain.

28. The apparatus according to claim 23, wherein said analysing means includes means for analysing regions of a region adjacency graph using said biased statistical or probabilistic interpretation model to provide a labelled region adjancey graph.

29. The apparatus according to claim 28, wherein said region analysis means uses adjusted prior probabilities of a plurality of labels to provide said labelled region adjacency graph.

30. The apparatus according to claim 22, wherein said digital video signal is generated using a digital video recording device.

31. The apparatus to claim 30, wherein one or more portions of said contextual data is generated by one or more sensors of said digital video recording device.

32. A computer program stored in a computer readable medium, said computer program being configured for interpreting a digital video signal, wherein said digital video signal has contextual data, said computer program comprising:
code for segmenting said digital video signal into one or more video segments, each segment having one or more video frames, and each said video frame having a corresponding portion of said contextual data;
code for determining a plurality of regions for at least one video frame of a respective video segment;
code for processing said regions for each video segment to provide a region adjacency graph at one or more temporal instances in the respective video segment, said region adjacency graph representing adjacencies between regions for a corresponding frame of said respective video segment; and
code for analyzing said region adjacency graphs to produce a corresponding labeled region adjacency graph comprising at least one semantic label, said analysis being dependent upon a corresponding portion of said contextual data, wherein said labeled region adjacency graph represents an interpretation of said digital video signal.

33. The computer program according to claim 32, further comprising code for biasing a statistical or probabilistic interpretation model dependent upon said corresponding portion of contextual data.

34. The computer program according to claim 33, wherein said biasing code includes code for selecting a predetermined application domain from a plurality of application domains dependent upon said corresponding portion of contextual data, said application domain comprising a set of semantic labels appropriate for use with said application domain.

35. The computer program according to claim 33, wherein said biasing code includes code for adjusting at least one prior probability of a respective one of a plurality of semantic labels in at least one application domain.

36. The computer program according to claim 33, wherein said analyzing code utilizes said biased statistical or probabilistic interpretation model.

37. The computer program according to claim 36, wherein said analyzing code includes at least one application domain.

38. The computer program according to claim 33, wherein said analyzing code includes code for analyzing regions of a region adjacency graph using said biased statistical or probabilistic interpretation model to provide a labeled region adjacency graph.

39. The computer program according to claim 38, wherein said region analysis code uses adjusted prior probabilities of a plurality of labels to provide said labeled region adjacency graph.

40. The computer program according to claim 32, wherein said digital video signal is generated using a digital video recording device.

41. The computer program according to claim 40, wherein one or more portions of said contextual data is generated by one or more sensors of said digital video recording device.

42. A method of interpreting a digital video signal, wherein said digital video signal has contextual data, said method comprising the steps of:

segmenting said digital video signal into one or more video segments, each segment having one or more video frames and a corresponding portion of said contextual data;

determining a plurality of regions for at least one video frame of a respective video segment;

processing said regions for each video segment to provide a region adjacency graph at one or more temporal instances in the respective video segment dependent upon said corresponding portion of said contextual data, said region adjacency graph representing adjacencies between regions for a corresponding frame of said respective video segment; and analyzing said region adjacency graphs to interpret said digital video signal.

43. An apparatus for interpreting a digital video signal, wherein said digital video signal has contextual data, said apparatus comprising:

means for segmenting said digital video signal into one or more video segments, each segment having one or more video frames and a corresponding portion of said contextual data;

means for determining a plurality of regions for at least one video frame of a respective video segment;

means for processing said regions for each video segment to provide a region adjacency graph at one or more temporal instances in the respective video segment dependent upon said corresponding portion of said contextual data, said region adjacency graph representing adjacencies between regions for a corresponding frame of said respective video segment; and means for analyzing said region adjacency graphs to interpret said digital video signal.

44. A computer program stored in a computer readable medium, said computer program being configured for interpreting a digital video signal, wherein said digital video signal has contextual data, said computer program comprising:

code for segmenting said digital video signal into one or more video segments, each segment having one or more video frames and a corresponding portion of said contextual data;

code for determining a plurality of regions for at least one video frame of a respective video segment;

code for processing said regions for each video segment to provide a region adjacency graph at one or more temporal instances in the respective video segment dependent upon said corresponding portion of said contextual data, said region adjacency graph representing adjacencies between regions for a corresponding frame of said respective video segment; and code for analyzing said region adjacency graphs to interpret said digital video signal.

* * * * *

UNITED STATES PATENT AND TRADEMARK OFFICE
CERTIFICATE OF CORRECTION

PATENT NO. : 6,516,090 B1
DATED : February 4, 2003
INVENTOR(S) : Alison Joan Lennon et al.

It is certified that error appears in the above-identified patent and that said Letters Patent is hereby corrected as shown below:

Title page,
Item [30], Foreign Application Priority Data, "May 7, 1998 (AT) …… PP3407" should read -- May 7, 1998 (AU) …… PP3407 --
Item [56], U.S. PATENT DOCUMENTS, "6,281,983 B1" should read -- 6,282,986 B1 --.
Item [56], OTHER PUBLICATIONS, after "Hierarchy-Based", "Imaage" should read -- Image --; and after "A Markow Random", "Acadamic" should read -- Academic --.
Item [57], ABSTRACT,
Line 3, after "in the image and", "analysing" should read -- analyzing --; and after "Secondly", "analysing" should read -- analyzing --.

Drawings,
Sheet 7, Figure 7, "Analysing" (all occurrences) should read -- Analyzing --.

Column 2,
Line 27, "technology." should read -- technology --.

Column 6,
Line 10, "input output" should read -- input/output --.

Column 7,
Line 51, "25" should be deleted.

Column 10,
Line 20, "($X_i=x_j|X_j=x_j$," should read -- ($X_i=x_i|X_j=x_j$, --.

Column 11,
Line 10, "$X_j$at" should read -- $x_j$ at --; and
Line 18, " $\sum_{x \in L,}$ " should read -- $\sum_{x \in L}$ --.

Column 12,
Line 56, "information" should read -- information. --.

Column 14,
Lines 53, 55 and 56, "data" should read -- data; --; and
Line 66, "claim 1 said" should read -- claim 1, --.

UNITED STATES PATENT AND TRADEMARK OFFICE
CERTIFICATE OF CORRECTION

PATENT NO.    : 6,516,090 B1
DATED         : February 4, 2003
INVENTOR(S)   : Alison Joan Lennon et al.

It is certified that error appears in the above-identified patent and that said Letters Patent is hereby corrected as shown below:

Column 15,
Line 3, "to 7," should read -- to claim 7, --;
Line 28, "method" should read -- method according --; and
Line 51, "recoding" should read -- recording --.

Column 16,
Line 1, "video," should read -- video segment, --;
Line 8, "won" should read -- upon --;
Line 7, "label" should read -- label, --;
Lines 27 and 30, "analysing" should read -- analyzing --;
Line 32, "analysing" (all occurrences) should read -- analyzing --; and
Line 43, "apparatus" should read -- apparatus according --.

Column 17,
Line 42, "of;" should read -- of: --.

Signed and Sealed this

Sixth Day of January, 2004

JAMES E. ROGAN
*Director of the United States Patent and Trademark Office*